United States Patent
Tharp et al.

[11] Patent Number: 5,873,608
[45] Date of Patent: Feb. 23, 1999

[54] SAFETY DEVICE FOR QUICK DISCONNECT COUPLINGS

[76] Inventors: Jeffrey McClain Tharp, Vallejo, Calif.; Marcella Tharp, legal representative, 968 Admiral Callaghan La., Vallejo, Calif. 94591

[21] Appl. No.: 899,266

[22] Filed: Jul. 23, 1997

[51] Int. Cl.⁶ .............................. F16L 35/00; A44B 21/00
[52] U.S. Cl. ............................................ 285/114; 285/117
[58] Field of Search ...................................... 285/114, 117

[56] References Cited

U.S. PATENT DOCUMENTS

| | | | |
|---|---|---|---|
| 393,400 | 11/1888 | Sharpneck | 285/114 |
| 739,097 | 9/1903 | Marcy | 285/114 |
| 766,961 | 8/1904 | Morris | 285/114 |
| 1,384,962 | 7/1921 | Kuhne | 285/114 |
| 2,963,305 | 12/1960 | Miller | 285/114 |
| 3,197,240 | 7/1965 | Lindberg | 285/114 |
| 3,813,733 | 6/1974 | Flohr | 285/117 |
| 3,859,692 | 1/1975 | Waterman | 285/117 |
| 5,368,337 | 11/1994 | Torres | 285/114 |

*Primary Examiner*—Eric K. Nicholason

[57] ABSTRACT

The present invention relates to a safety device which finds particular application in association with the quick disconnect assembly of a pneumatic hose. In its broadest context, the present invention includes a first hose clamp which is adapted to be removably secured to a first segment of pneumatic hose. The present invention also includes a similar second hose clamp which is adapted to be removably secured to a second segment of pneumatic hose. These two hose clamps are interconnected by way of a length of cord. When in use, the two clamps and cord prevent the first and second segments of hose from falling away from each other.

1 Claim, 1 Drawing Sheet

SAFETY DEVICE FOR QUICK DISCONNECT COUPLINGS

BACKGROUND OF THE INVENTION

1. Field of the Invention

The present invention relates to a safety device and more particularly pertains to such a device for use upon a quick disconnect assembly.

2. Description of the Prior Art

The use of connectors is known in the prior art. More specifically, connectors are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,440,465 to Elliott et al discloses an electrical plug connector lock. U.S. Pat. No. 5,393,243 to Carmo discloses a releasable cord connecting lock. U.S. Design Pat. No. 353,578 to Johnson discloses an electrical plug and connection holder. U.S. Pat. No. 4,206,961 to Cifalde discloses an extension cord clip. U.S. Pat. No. 5,336,106 to Osten discloses a cord connector. Lastly, U.S. Pat. No. 5,336,107 to Sheryll discloses a plug retention device.

In this respect, the safety device of the present invention substantially departs from the conventional concepts and designs of the prior art, and in so doing provides an apparatus primarily developed for the purpose of preventing the two ends of a quick disconnect from separating after uncoupling.

Therefore, it can be appreciated that there exists a continuing need for improved safety devices for interconnections. In this regard, the present invention substantially fulfills this need.

SUMMARY OF THE INVENTION

In view of the foregoing disadvantages inherent in the known types of connectors now present in the prior art, the present invention provides a safety device for a quick disconnect assembly. As such, the general purpose of the present invention, which will be described subsequently in greater detail, is to provide a means to prevent the ends of a quick disconnect from falling away from one another after beccoming uncoupled.

To attain this, the present invention essentially comprises a safety device for a pneumatic hose quick disconnect assembly. The device includes a first hose serving to transport a supply of air, wherein the first hose has a terminal end. The hose includes a first quick disconnect assembly secured to the terminal end of the first hose. A second hose serves to transport a supply of air, the second hose has a terminal end. A second disconnect assembly is secured to the terminal end of the second hose, with the second disconnect assembly being removably interconnected to the first disconnect assembly by way of a quick disconnect means. This quick disconnect means causes the disconnection of the first and second disconnects when the supply of air traveling from the first hose to the second hose reaches a predetermined value. A first hose clamp is formed of a first c-shaped half interconnected to a second s-shaped half by way of a hinge. A ring is formed proximate the hinge, and a screw guard is integral with the first c-shaped half. A screw housing is integral with the second c-shaped half, with the screw housing and screw guard being in axial alignment with one another. A screw is adapted to engage the screw housing and the screw guard, with the screw having a distal end formed into a flat finger engaging portion. The first hose clamp is adapted to be secured about the first hose by way of the screw. A second hose clamp is formed of a first c-shaped half interconnected to a second c-shaped half by way of a hinge, a ring formed proximate the hinge, with a screw guard integral with the first c-shaped half. A screw housing is integral with the second c-shaped half. The screw housing and screw guard are in axial alignment with one another. A screw is adapted to engage the screw housing and the screw guard, with the screw having a distal end formed into a flat finger engaging portion. The second hose clamp is adapted to be secured about the second hose by way of the screw. An interconnecting cord has a first end secured to the ring of the first hose clamp, and a second end secured to the ring of the second hose clamp.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved safety device which prevents the ends of a quick disconnect from coming apart or otherwise creating a dangerous situation.

It is another object of the present invention to provide a simple device for keeping the ends of a hose together.

It is a further object of the present invention to provide a device that can be retrofitted onto existing hoses.

An even further object of the present invention is to provide a safety device which is susceptible of a low cost of manufacture with regard to both materials and labor, and which accordingly is then susceptible of low prices of sale to the consuming public, thereby making such safety device economically available to the buying public.

Still yet another object of the present invention is to a safety device which provides in the apparatuses and methods of the prior art some of the advantages thereof, while simultaneously overcoming some of the disadvantages normally associated therewith.

Still another object of the present invention is to provide a safety device which finds particular application in association with the quick disconnect assembly of a pneumatic hose. In its broadest context, the present invention includes a first hose clamp which is adapted to be removably secured to a first segment of pneumatic hose. The present invention also includes a similar second hose clamp which is adapted to be removably secured to a second segment of pneumatic hose. These two hose clamps are interconnected by way of a length of cord. When in use, the two clamps and cord prevent the first and second segments of hose from falling away from each other.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

The present invention relates to a safety device which finds particular application in association with the quick disconnect assembly of a pneumatic hose. In its broadest context, the present invention includes a first hose clamp which is adapted to be removably secured to a first segment of pneumatic hose. The present invention also includes a similar second hose clamp which is adapted to be removably secured to a second segment of pneumatic hose. These two hose clamps are interconnected by way of a length of cord. When in use, the two clamps and cord prevent the first and second segments of hose from falling away from each other. The various details of the present invention, and the manner in which they interrelate, will be described in greater detail hereinafter.

Figure 1:
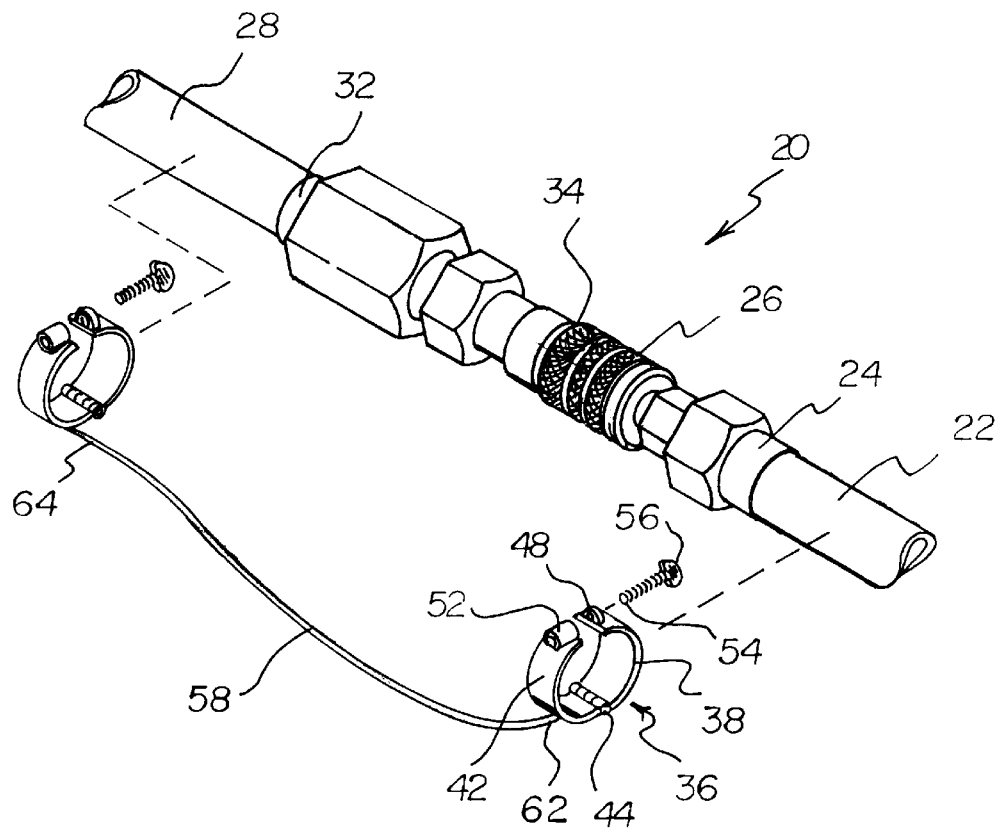
FIG. 1 is perspective illustration of the safety device of the present invention.

The pneumatic assembly in which the present invention finds application generally includes a first hose 22 serving to transport a supply of air. Typically, this is a pressurized source of air. The first hose 22 includes a terminal end 24 as depicted in FIG. 1. Additionally, a first quick disconnect assembly 26 is secured to the terminal end 24 of the first hose 22. Likewise, the assembly includes a second hose 28 which also serves to transport a supply of air. In this manner a source of pressurized air travels from the first hose 22 to the second hose 28. As depicted in FIG. 1, the second hose 28 has a terminal end 32.

The second quick disconnect assembly 34 is secured to the terminal end 32 of the second hose 28. The second quick disconnect assembly 34 is removably interconnected to the first disconnect assembly 26 by way of a quick disconnect means. This quick disconnect means functions to cause the disconnection of the first and second disconnects when the supply of air traveling from the first hose 22 to the second hose 28 reaches a predetermined value.

Figure 2:
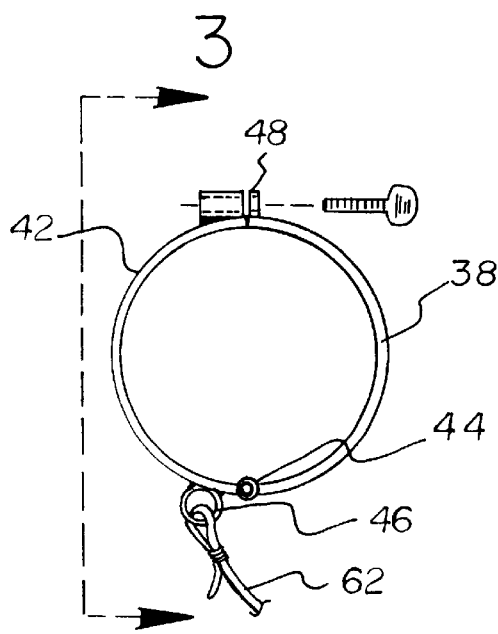
FIG. 2 is an elevational view of one of the hose clamps of the present invention.
Figure 3:
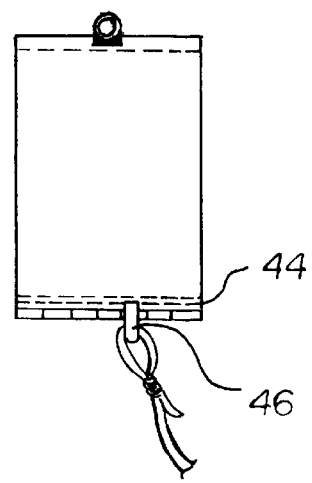
FIG. 3 is a view taken along line 3—3 of FIG. 2.

The safety device 20 for use upon the quick disconnection assembly will next be described. Generally, the safety device 20 includes a first hose clamp 36 which is formed of a first c-shaped half 38 interconnected to a second c-shaped half 42 by way of a hinge 44. The arrangement of the first hose clamp 36 is depicted in FIG. 2. In the preferred embodiment, a ring 46 is formed proximate the hinge 44. The function of this ring 46 will be described in greater detail hereinafter.

The first hose clamp 36 further includes a screw guard 48 formed integral with the first c-shaped half 38, and a screw housing 52 integral with the second c-shaped half 42. The screw housing 52 and screw guard 48 are in axial alignment with one another. When joined, the housing 52 and guard 48 provide an internally threaded passage which is adapted to receive an externally threaded screw 54. Specifically, the screw 54 is adapted to engage the screw housing 52 and the screw guard 48. In the preferred embodiment, the screw 54 has a distal end formed into a flat finger engaging portion 56. Such a configuration allows the screw to be manipulated by hand. The first hose clamp 36 is thus adapted to be secured about the first hose 22 by way of the screw 54.

The second hose clamp is of similar construction, thus the references numbers for the second hose clamp have been omitted. Specifically, the second hose clamp is formed of a first c-shaped half interconnected to a second c-shaped half by way of a hinge. In the preferred embodiment a ring is formed proximate the hinge.

Additionally, a screw guard is formed integrally with the first c-shaped half, and a screw housing is formed integrally with the second c-shaped half. The screw housing and screw guard being in axial alignment with one another. When joined the guard and housing form an internally threaded passage. An externally threaded screw is adapted to engage the screw housing and the screw guard to thereby secure the second hose clamp about a length of hose. In the preferred embodiment, the screw has a distal end which is formed into a flat finger engaging portion. The second hose clamp is thus adapted to be secured about the second hose by way of the screw.

With reference to FIG. 1, an interconnecting cord 58 serves to connect to first and second hose clamps. Specifically, the cord has a first end 62 secured to the ring of the first hose clamp, and a second end 64 secured to the ring of the second hose clamp.

In use, the first hose clamp is secured about the first length of hose by placing each c-shaped half about the hose and then securing the screw into the screw guard and screw housing. The second hose clamp is similarly situated upon the second length of hose. So positioned, the device prevents the two lengths of the hose from falling away from one another after becoming disconnected.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A safety device for a pneumatic hose quick disconnect assembly comprising in combination:

a first hose serving to transport a supply of air, the first hose having a terminal end;

a first quick disconnect assembly secured to the terminal end of the first hose;

a second hose serving to transport a supply of air, the second hose having a terminal end;

a second quick disconnect assembly secured to the terminal end of the second hose, the second disconnect assembly being removably interconnected to the first disconnect assembly by way of a quick disconnect means, the quick disconnect means causing the disconnection of the first and second disconnects when the supply of air traveling from the first hose to the second hose reaches a predetermined value;

a first hose clamp being formed of a first c-shaped half interconnected to a second c-shaped half by way of a hinge mounted on ends thereof, a ring formed proximate the hinge, a screw guard integral with the first c-shaped half, a screw housing integral with the second c-shaped half, the screw housing and screw guard being in axial alignment with one another, wherein the screw housing has a thickness of about 4 times that of the screw guard, a screw adapted to engage the screw housing and the screw guard, the screw having a distal end formed into a flat finger engaging portion, the first hose clamp adapted to be secured about the first hose by way of the screw;

a second hose clamp being formed of a first c-shaped half interconnected to a second c-shaped half by way of a hinge, a ring formed proximate the hinge, a screw guard integral with the first c-shaped half, a screw housing integral with the second c-shaped half, the screw housing and screw guard being in axial alignment with one another, wherein the screw housing has a thickness of about 4 times that of the screw guard, a screw adapted to engage the screw housing and the screw guard, the screw having a distal end formed into a flat finger engaging portion, the second hose clamp adapted to be secured about the second hose by way of the screw;

an interconnecting cord having a first end secured to the ring of the first hose clamp, and a second end secured to the ring of the second hose clamp.

\* \* \* \* \*